(12) United States Patent
Rollins et al.

(10) Patent No.: US 8,629,640 B2
(45) Date of Patent: *Jan. 14, 2014

(54) INTEGRATED FAN DRIVE SYSTEM FOR AIR-COOLED HEAT EXCHANGERS (ACHE)

(75) Inventors: Patrick Rollins, Canandaigua, NY (US); George Lucas, Hammondsport, NY (US)

(73) Assignee: Prime Datum, Inc., Canandaigua, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,434

(22) Filed: May 15, 2012

(65) Prior Publication Data

US 2012/0222832 A1  Sep. 6, 2012

Related U.S. Application Data

(63) Continuation of application No. 12/677,333, filed as application No. PCT/US2009/037242 on Mar. 16, 2009, now Pat. No. 8,188,698.

(60) Provisional application No. 61/038,851, filed on Mar. 24, 2008.

(51) Int. Cl.
    *F28D 5/00*  (2006.01)

(52) U.S. Cl.
    USPC  318/400.41; 318/268; 261/127; 261/DIG. 11

(58) Field of Classification Search
    USPC ............ 318/268, 471–473, 481, 700, 400.01, 318/400.41; 261/127, 150, 158, DIG. 11
    See application file for complete search history.

(56) References Cited

U.S. PATENT DOCUMENTS

| | | | |
|---|---|---|---|
| 3,318,586 A | 5/1967 | Meredith | |
| 3,853,174 A | 12/1974 | Kramer | |

(Continued)

FOREIGN PATENT DOCUMENTS

| | | |
|---|---|---|
| CN | 2421602 | 2/2001 |
| CN | 1818528 | 8/2006 |

(Continued)

OTHER PUBLICATIONS

Facao, Jorge and Oliveira, Armando C., "Thermal Behaviour of Closed Wet Cooling Towers for Use With Chilled Ceilings", Applied Thermal Engineering 20 (2000) pp. 1225-1236, Porto, Portugal (Exhibit_7).

(Continued)

*Primary Examiner* — Bentsu Ro
(74) *Attorney, Agent, or Firm* — Raymond A. Nuzzo

(57) ABSTRACT

An air-cooled heat exchanger (ACHE) for cooling process fluids used in an industrial process. In one embodiment, the ACHE is configured as a forced-draft ACHE. A support structure supports the forced draft ACHE above grade. A tube bundle is supported by the structure and is configured to receive process fluids used in an industrial process. A plenum is connected to the support structure, positioned beneath the tube bundle and configured to direct air-flow through the tube bundle. A fan is supported by the support structure and positioned beneath the plenum. Rotation of the fan produces an air-flow that is directed through the tube bundle by the plenum. A fan drive system is supported by the support structure, positioned beneath the fan and comprises a permanent magnet motor comprising a motor casing, a stator and a rotatable shaft, the rotatable shaft being connected to the fan.

21 Claims, 14 Drawing Sheets

(56) References Cited

U.S. PATENT DOCUMENTS

| | | | |
|---|---|---|---|
| 4,468,171 | A | 8/1984 | Katsumata |
| 5,093,891 | A | 3/1992 | Komiyama |
| 5,600,960 | A | 2/1997 | Schwedler et al. |
| 5,628,201 | A | 5/1997 | Bahel et al. |
| 6,019,165 | A | 2/2000 | Batchelder |
| 6,211,635 | B1 * | 4/2001 | Kambe et al. ............ 318/400.11 |
| 6,257,007 | B1 | 7/2001 | Hartman |
| 6,282,910 | B1 | 9/2001 | Helt |
| 6,446,941 | B1 | 9/2002 | Maheshwari et al. |
| 6,943,475 | B2 | 9/2005 | Enomoto |
| 7,190,099 | B2 | 3/2007 | Kawasaki |
| 7,191,826 | B2 | 3/2007 | Byrnes et al. |
| 7,479,876 | B2 | 1/2009 | Carle |
| 7,539,549 | B1 | 5/2009 | Discenzo et al. |
| 7,626,349 | B2 | 12/2009 | Marcinkiewicz |
| 7,949,483 | B2 | 5/2011 | Discenzo et al. |
| 2004/0086394 | A1 | 5/2004 | Kohonen et al. |
| 2004/0136842 | A1 | 7/2004 | Obara |
| 2004/0160139 | A1 | 8/2004 | Enomoto |
| 2006/0197394 | A1 | 9/2006 | Applegate |

FOREIGN PATENT DOCUMENTS

| | | |
|---|---|---|
| CN | 2916562 | 6/2007 |
| JP | 61155614 | 7/1986 |
| JP | 2001099089 | 10/2001 |
| JP | 2006322658 | 11/2006 |

OTHER PUBLICATIONS

ABB OY,"DriveIT Permanent Magnet Motors," Catalogue BU/Permanent magnet motors GB May 2004, pp. 1-72, Printed in Finland, Waasa Graphics Oy, May 2004 (Exhibit_9-A).

ABB OY, "DriveIT Low Voltage Permanent Magnet Motors for low speed applications" Leaflet, TM13 EN REVB 2003, pp. 1-2, 2003, Finland (Exhibit_9-B).

Ikaheimo, Jouni,"Permanent Magnet Motors Eliminate Gearboxes," ABB Review Apr. 2002, p. 22-25 Vaasa, Finland (Exhibit_9-C).

Ikaheimo, Jouni, "New roles for permanent magnet technology", ABB Review, May 2004, ISSN: 1013-3119, pp. 37-40, ABB Ltd. ,Zurich, Switzerland (Exhibit_9-D).

ABB Ltd., "Compact and Complete DriveIT low voltage AC drive, ACS 800," ABB Review, Apr. 2002, pp. 16-21, Zurich, Switzerland (Exhibit_10-A).

ABB OY, "ACS800 Firmware Manual IGBT Supply Control Program 7.x", No. 3AFE68315735 REV C / EN, pp. 1-86, Mar. 28, 2006, Helsinki, Finland (Exhibit_10-B).

ABB OY, "Permanent Magnet Synchronous Machine Drive Application Program," Supplement to Firmware Manual for ACS800 Standard Application Program 7.x, No. 3AFE68437890 REV B / EN, Jan. 19, 2005, pp. 1-48, Helsinki, Finland (Exhibit_10-C).

ABB OY, "ACS 800 Pump and Fan Control (PFC) Application Program 7.x," Firmware Manual, No. 3AFE 64649337 REV A, Jul. 22, 2002, pp. 1-178., Helsinki, Finland (Exhibit_10-D).

ABB OY, "ACS800-02 Drives (45 to 560 kW),ACS800-U2 Drives (60 to 600 HP)," Hardware Manual, No. 3AFE64567373 Rev F EN, Aug. 15, 2007, Helsinki, Finland (Exhibit_10-E).

ABB, "ControlIT AC 800C Controller the compact and cost-effective process controller" Brochure No. 3BSE 021 362R0301, pp. 1-6, 2002, Västerås, Sweden. (Exhibit_11-A).

ABB, "ControlIT Control Software and Tools for AC 800M and AC 800C," Brochure No. 3BSE 021 361 R0201, pp. 1-8, 2002, Västerås Sweden. (Exhibit_11-B).

ABB, "ControlIT Control Software and Tools for AC 800M and AC 800C," Data Sheet No. 3BSE021360R0301, pp. 1-2, 2004, Västerås Sweden. (Exhibit_11-C).

ABB, "IndustrialIT Compact Control Builder AC 800M" Product Guide Version 5.0, 3BSE041586R101, pp. 1-108, Jun. 2006, Printed in Sweden (Exhibit_11-D).

ABB, "IndustrialIT Compact Control Builder AC 800M Basic Control Software Introduction and Configuration" User Manual,Version 5.0, 3BSE040935R201 Rev A., pp. 1-446, Jun. 2006, Printed in Sweden (Exhibit_11-E).

ABB, "5200 I/O System Units," Data Sheet, 3BSE 021 366 R201, pp. 1-12, May 2002, Printed in Sweden (Exhibit_11-F).

ABB, "IndustrialIT Compact Control Builder AC 800M Extended Control Software Binary and Analog Handling" User Manual, Version 5.0, 3BSE041488R101, pp. 1-434, Jun. 2006, Printed in Sweden (Exhibit_11-G).

Smith, "Variable Frequency Drives & Cooling Towers", Joliet Technologies available at <http://www.joliettech.com/variable-frequency-drives_and_cooling-towers.htm> (last retrieved on Aug. 1, 2012) (archived copy dated Aug. 27, 2003 available at the Internet Archive, <http://www.archive.org/web/20030827203317/http://www. http://www.joliettech.com/variable-frequency-drives_and_cooling-towers.htm>) (hereinafter "Smith") (Exhibit_12).

* cited by examiner

INTEGRATED FAN DRIVE SYSTEM FOR AIR-COOLED HEAT EXCHANGERS (ACHE)

CROSS-REFERENCE TO RELATED APPLICATIONS

This application is a continuation application of U.S. application Ser. No. 12/677,333, filed Apr. 7, 2010, now U.S. Pat. No. 8,188,698 which claims priority to international application no. PCT/US2009/037242, filed Mar. 16, 2009, which claims the benefit of U.S. provisional application No. 61/038,851, filed Mar. 24, 2008. The entire disclosures of the aforesaid application No. 61/038,851, PCT/US2009/037242 and Ser. No. 12/677,333 are hereby incorporated by reference.

TECHNICAL FIELD

The present invention generally relates to fan drive systems for use with air-cooled heat exchangers (ACHE).

BACKGROUND ART

Air Cooled Heat Exchangers (ACHE) are well known in the art and are used for cooling in a variety of industries including power plants, petroleum refineries, petrochemical and chemical plants, natural gas processing plants, and other industrial facilities that implement energy intensive processes. ACHE exchangers are used typically where there is lack of water, or when water usage permits cannot be obtained, or where there is not sufficient real estate to build a tower. ACHEs lack the cooling effectiveness of "Wet Towers".

Typically, an ACHE uses a finned-tube bundle with rectangular box headers on both ends of the tubes. Cooling air is provided by one or more large fans. Usually, the air blows upwards through a horizontal tube bundle. The fans can be either forced or induced draft, depending on whether the air is pushed or pulled through the tube bundle. The space between the fan(s) and the tube bundle is enclosed by a plenum chamber which directs the air (flow field) over the tube bundle assembly thereby providing cooling. The whole assembly is usually mounted on legs or a pipe rack. The fans are usually driven by electric induction motors through some type of speed reducer. The speed reducers are typically V-belts, HTD drives, or right-angle gears. The fan drive assembly is supported by a steel mechanical drive support system. They usually include a vibration switch on each fan to automatically shut down a fan which has become imbalanced for some reason. Airflow is very important in ACHE cooling to ensure that the air has the proper "flow field" and velocity to maximize cooling. Turbulence and "choked-flow conditions can impair cooling efficiency. Therefore, mass airflow is the key parameter to removing heat from the tube and bundle system. ACHE cooling differs from "wet" cooling (i.e. wet cooling towers) in that ACHE systems do not use water to cool the tube bundle and thus, do not benefit from the latent heat of vaporization or "evaporative cooling".

Prior art ACHE fan drive systems use any one of a variety of fan drive components. Examples of such components include electric motors, steam turbines, gas or gasoline engines, or hydraulic motors. The most common drive device is the electric motor. Steam and gas drive systems have been used when electric power is not available. Hydraulic motors have also been used with limited success. Specifically, although hydraulic motors provide variable speed control, they have relatively low efficiencies.

Fan-tip speed should not exceed 12,000 feet per minute for mechanical reasons, and may be reduced to obtain lower noise levels. Motor and fan speed are sometimes controlled with variable frequency drives. The most commonly used speed reducer is the high-torque, positive type belt drive, which uses sprockets that mesh with the timing belt cogs. They are used with motors up to 50 or 60 horsepower, and with fans up to about 18 feet in diameter. Banded V-belts are still often used in small to medium sized fans, and gear drives are used with very large motors and fan diameters. Fan speed is set by using a proper combination of sprocket or sheave sizes with timing belts or V-belts, and by selecting a proper reduction ratio with gears. In many instances, right-angle gear boxes are used as part of the fan drive system in order to translate and magnify torque from an offset electrical motor. However, belt drives, pulleys and right-angle gear boxes have poor reliability.

The aforesaid complex, prior art mechanical drive systems require stringent maintenance practices to achieve acceptable levels of reliability. In particular, one significant problem with ACHE fan systems is the poor reliability of the belt due to belt tension. A common practice is to upgrade to "timing belts" and add a tension system. One technical paper, entitled "*Application of Reliability Tools to Improve V-Belt Life on Fin Fan Cooler Units*", by Rahadian Bayu of PT. Chevron Pacific Indonesia, Riau, Indonesia, presented at the 2007 International Applied Reliability Symposium, addresses the reliability and efficiency of V-belts used in many prior art fan drive systems.

The reliability deficiencies of the belt and pulley systems and the gear reducer systems used in the ACHE fan drive systems often result in outages that are detrimental to mission critical industries such as petroleum refining, petro-chemical, power generation and other process intensive industries dependant on cooling. Furthermore, the motor systems used in the ACHE fan drive systems are complex with multiple bearings, auxiliary oil and lubrications systems, complex valve systems for control and operation, and reciprocating parts that must be replaced at regular intervals. Many petroleum refineries, power plants, petrochemical facilities, chemical plants and other industrial facilities utilizing prior art ACHE fan drive systems have reported that poor reliability of belt drive systems and right-angle drive systems has negatively affected production output. These industries have also found that service and maintenance of the belt drive and gearbox system are major expenditures in the life cycle cost, and that the prior art motors have experienced failure due to the mis-use of high pressure water spray.

The duty cycle required of an ACHE fan drive system is extreme due to intense humidity, dirt and icing conditions, wind shear forces, corrosive water treatment chemicals, and demanding mechanical drive requirements.

In an attempt to increase the efficiency of ACHE cooling systems, some end-users spray water directly on the ACHE system to provide additional cooling on process limiting, hot days. Furthermore, since fan blades can become "fouled" or dirty in regular service and lose performance, many end-users water-wash their ACHE system to maintain their cooling performance. However, directly exposing the ACHE system to high pressure water spray can lead to premature maintenance and/or failure of system components, especially since prior art drive systems are typically open thereby allowing penetration by water and other fluids.

Refining of petroleum cannot take place without cooling. Refineries process hydrocarbons at high temperatures and pressures. The loss of cooling within a refinery can lead to unstable and dangerous operating conditions requiring an immediate shut down of processing units. Cooling systems have become "mission critical assets" for petroleum refinery production. As demand for high-end products such as automotive and aviation fuel has risen and refining capacity has shrunk, the refineries have incorporated many new processes that extract hydrogen from the lower value by-products and recombined them into the higher value fuels, improving yield. Many of these processes depend on cooling to optimize the yield and quality of the product. Refining processes also incorporate many advanced processes that need reliable cooling systems to protect profitability. Cooling reliability has become mission critical to refinery profit and is affected by many factors such as environmental limitations on cooling water usage, inelastic supply chain pressures and variable refining margins. Many refineries have been adding processes that reform low grade petroleum products into higher grade and more profitable products such as aviation and automotive gasoline. These processes are highly dependent upon cooling systems to control the process temperatures and pressures that affect the product quality, process yield and safety of the process. In addition, these processes have tapped a great deal of the cooling capacity reserve leaving some refineries "cooling limited" on hot days and even bottlenecked. Most U.S. refineries operate well above 90% capacity and thus, uninterrupted refinery operation is critical to refinery profit and paying for the process upgrades implemented over the last decade. The effect of the interruption in the operation of cooling units with respect to the impact of petroleum product prices is described in the report entitled "Refinery Outages: Description and Potential Impact On Petroleum Product Prices", March 2007, U.S. Department of Energy.

Thus, the efficiency and production rate of a process is heavily dependent upon the efficiency of the ACHE cooling fan drive system and its ability to remove heat from the system.

Therefore, in order to prevent supply interruption of the inelastic supply chain of refined petroleum products, the reliability and subsequent performance of ACHE fan drive systems must be improved and managed as a key asset to refinery production and profit. An efficient and reliable fan drive system is required to maintain a relatively high cooling efficiency and prevent interruptions in production.

DISCLOSURE OF THE INVENTION

Accordingly, it is an object of the present invention to provide a fan drive system that substantially eliminates the aforementioned problems and disadvantages associated with prior art fan drive systems. The present invention is directed to, in one aspect, a fan drive system for an air-cooled heat exchanger system, comprising a high-torque, low speed permanent magnet motor having a rotatable shaft, a fan comprising a hub that is directly connected to the rotatable shaft and a plurality of fan blades that are attached to the hub, and a variable frequency drive device in electrical signal communication with the permanent magnet motor to control the rotational speed of the permanent magnet motor.

In a related aspect, the present invention is directed to an air-cooled heat exchanger system having a forced draft configuration, comprising a structure supporting a tube bundle, a fan rotatably mounted to the structure and positioned under the tube bundle, a high-torque, low speed permanent magnet motor supported by the structure and having a rotatable shaft that is connected to the fan, and a variable frequency drive device in electrical signal communication with the permanent magnet motor to control the rotational speed of the permanent magnet motor.

In a further aspect, the present invention is directed to an air-cooled heat exchanger system having an induced draft configuration, comprising a structure supporting a tube bundle, a fan rotatably mounted to the structure and positioned above the tube bundle, a high-torque, low speed permanent magnet motor supported by the structure and having a rotatable shaft that is connected to the fan, and a variable frequency drive device in electrical signal communication with the permanent magnet motor to control the rotational speed of the permanent magnet motor. In one embodiment, the high-torque, permanent magnet motor is positioned above the tube bundle. In another embodiment, the high-torque, permanent magnet motor is positioned below the tube bundle.

Other objects of the present invention, as well as particular features, elements and advantages thereof will be apparent from the following description and the accompanying drawing figures.

BRIEF DESCRIPTION OF THE DRAWINGS

Understanding of the present invention and the various aspects thereof will be facilitated by reference to the accompanying drawing figures submitted for the purposes of illustration only and not intended to define the scope of the invention. In which.

BEST MODE FOR CARRYING OUT THE INVENTION

Figure 1:
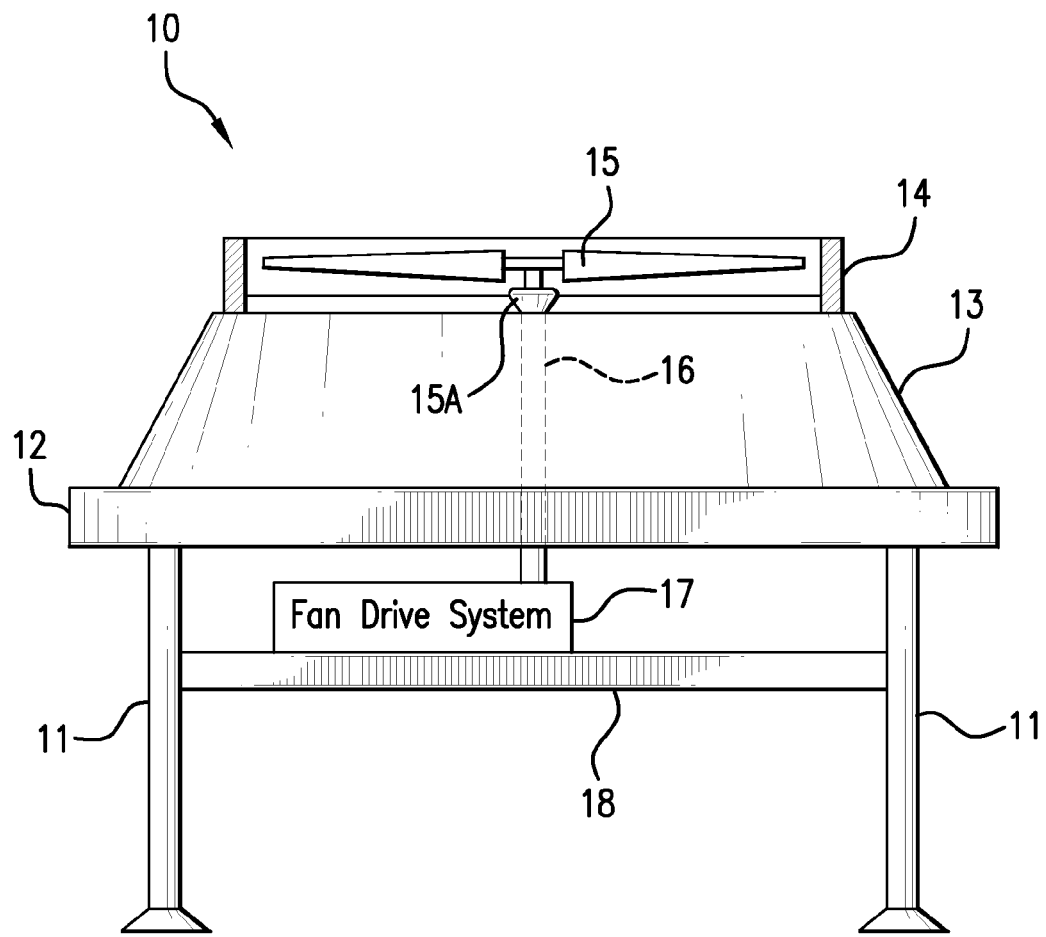
FIG. 1 is a basic diagram, partially in cross-section, of an induced draft, air-cooled heat exchanger (ACHE) system that uses a prior art fan drive system.
Figure 2:
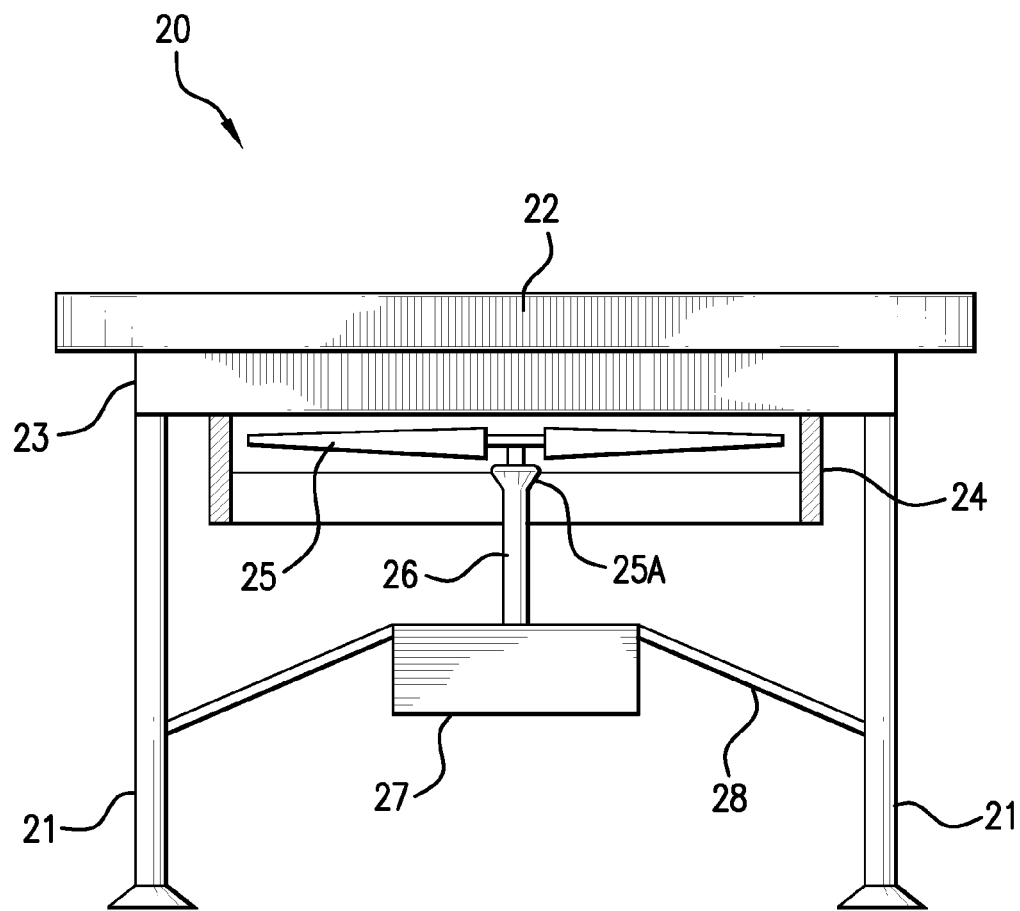
FIG. 2 is a basic diagram, partially in cross-section, of a forced draft, air-cooled heat exchanger (ACHE) system that uses a prior art fan drive system.
Figure 3:
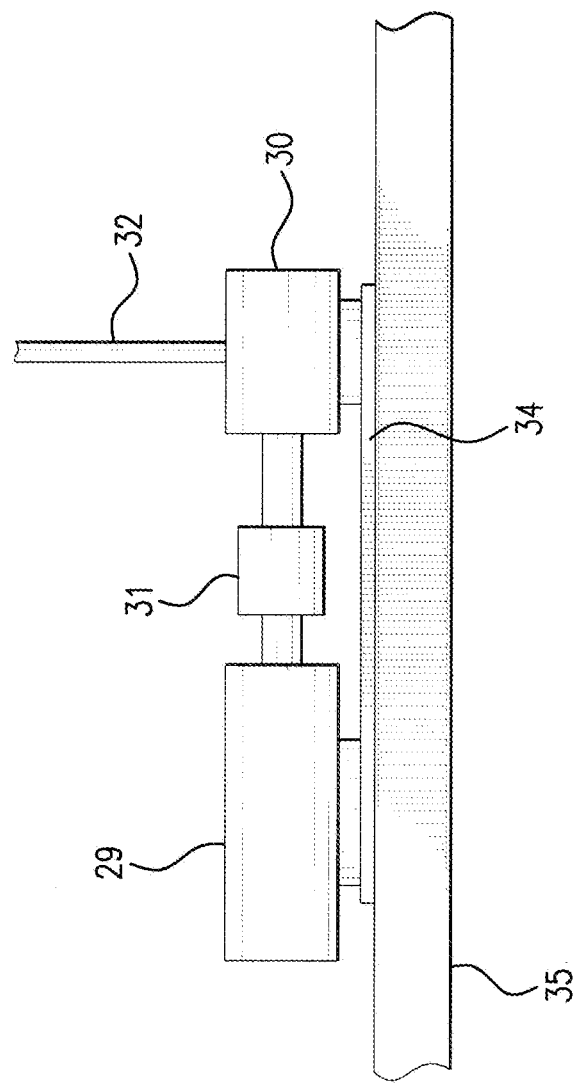
FIGS. 3 and 4 are side views of a prior art, gear-box type fan drive system.
Figure 4:
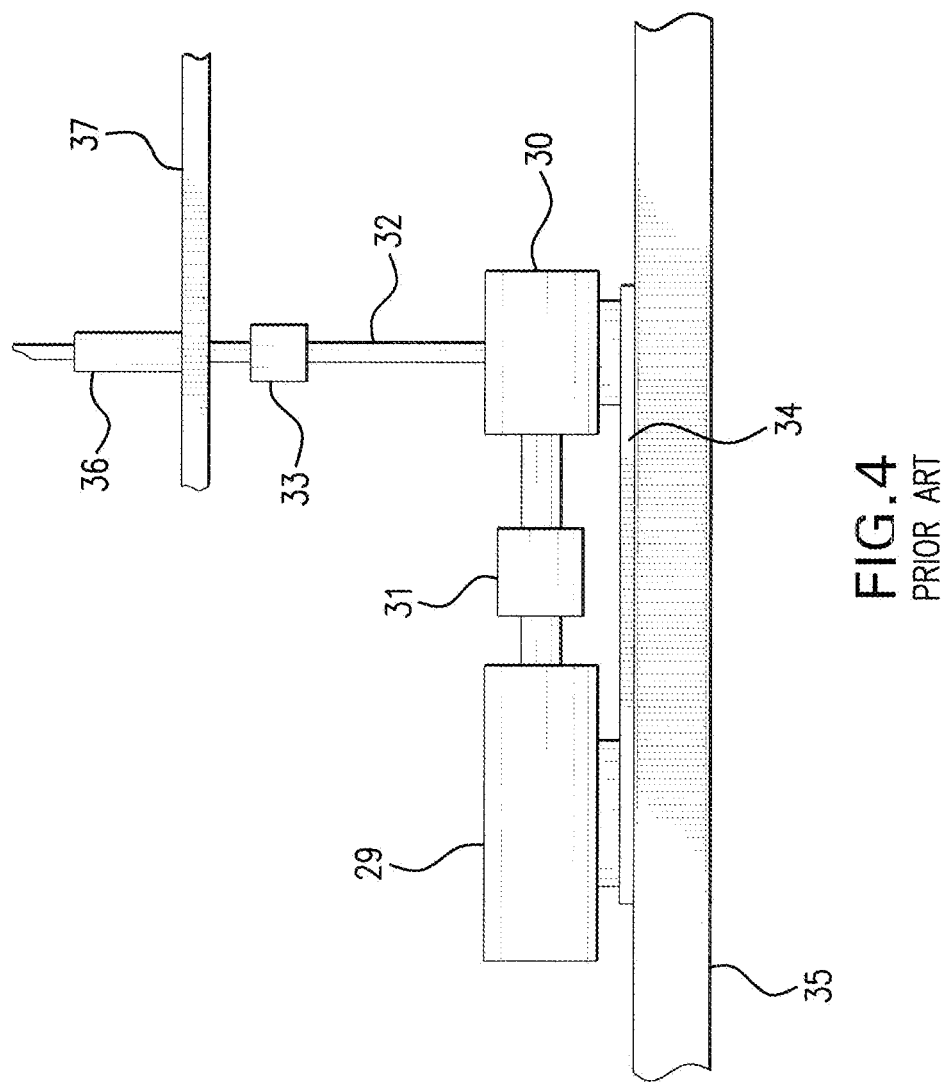

Referring to FIG. 1, there is shown a basic diagram of an air-cooled heat exchanger (ACHE) system 10 that uses a prior art fan drive system. ACHE system 10 is configured as an induced draft system. ACHE system 10 generally comprises a support structure that comprises a plurality of support columns 11. Tube bundle 12 is supported by the ACHE support structure. Plenum 13 is located above tube bundle 12. Fan ring 14 is attached to plenum 13. Fan 15 rotates within fan ring 14. Fan 15 has hub 15A. Vertically oriented fan shaft 16 extends through plenum 13 and tube bundle 12 and is connected to prior art fan drive system 17. Fan drive system 17 is typically supported by a support 18 that is connected to support columns 11 and or other portions of the ACHE support structure. Referring to FIG. 2, there is shown a basic diagram of another air-cooled heat exchanger (ACHE) system 20 that uses a prior art fan drive system. ACHE system 20 is configured as a forced draft system. ACHE system 20 generally comprises a support structure that comprises a plurality of support columns 21. Tube bundle 22 is supported by the ACHE support structure. Plenum 23 is located below tube bundle 22. Fan ring 24 is attached to and positioned under plenum 23. Fan 25 rotates within fan ring 24. Fan 25 has hub 25A. Vertically oriented fan shaft 26 is connected to prior art fan drive system 27. Fan drive system 27 is typically supported by support 28 that is connected to support columns 21 and/or to other portions of the ACHE support structure. Prior art fan drive systems 17 and 27 shown in FIGS. 1 and 2, respectively, can be configured as any one of the prior art fan drive systems discussed in the foregoing discussion. FIGS. 3, 4, 5 and 6 show the commonly or widely used prior art fan drive systems. FIGS. 3 and 4 show the common gear-box type fan drive system. This prior art fan drive system comprises induction motor 29 and right-angle gear box 30. The shaft of motor 29 is coupled to right-angle gear box 30 by coupling 31. Shaft 32 extends from gear box 30. A coupling 33 is connected to shaft 32. Induction motor 29 and gear box 30 are mounted to support plate 34. Support plate 34 is mounted to machinery mount 35. Support plate 34 and machinery mount structure 35 are part of the structure of the ACHE system. Fan mount 36 is attached to coupling 33. The fan (not shown) is connected to fan mount 36. Fan mount support members 37 provide support to fan mount 36.

Figure 5:
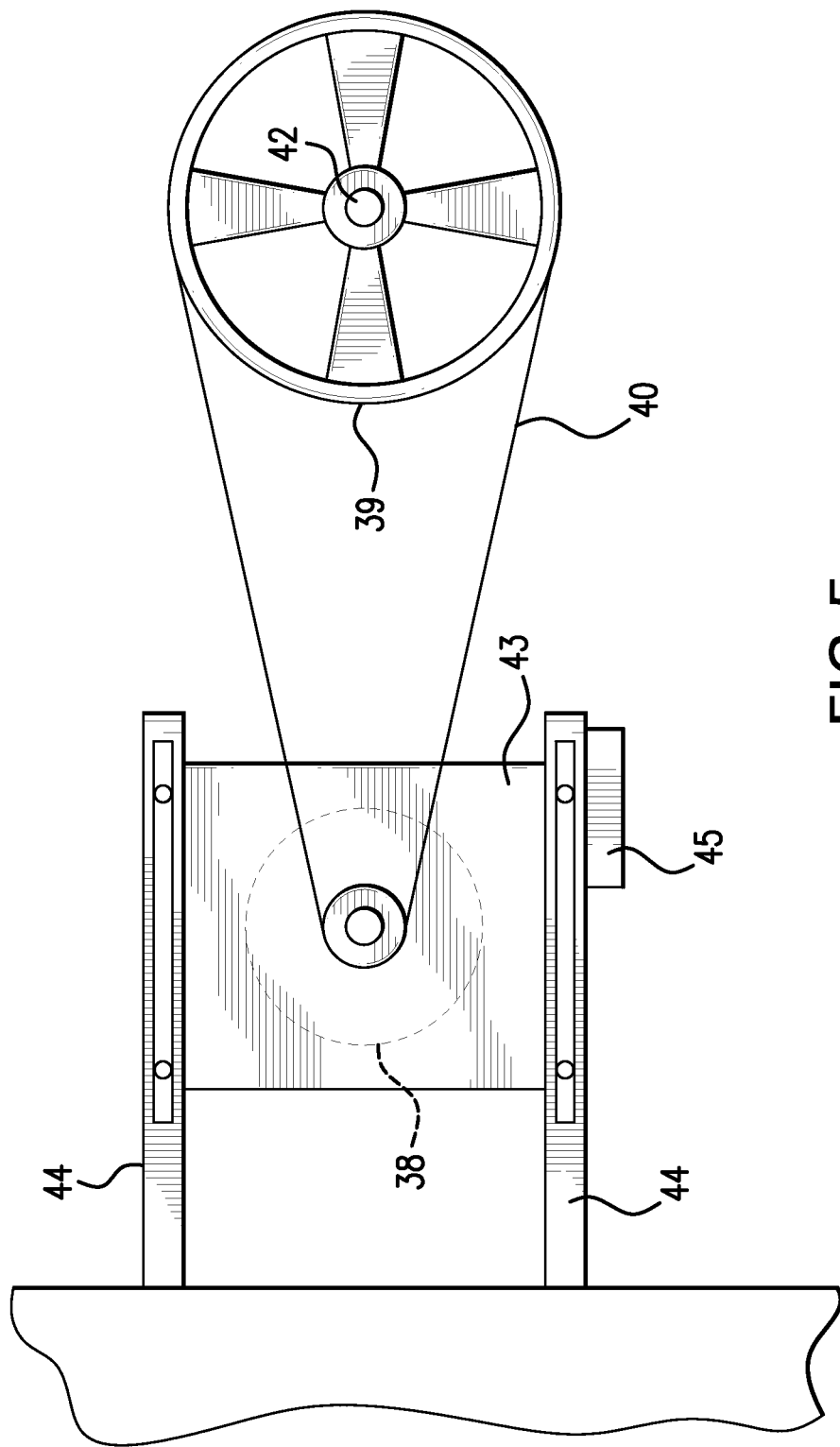
FIG. 5 is a partial, top plan view of a prior art, belt-driven fan drive system.

FIG. 5 shows a prior art fan-drive system that uses a belt-drive configuration to drive the fan in an ACHE system. This fan-drive system comprises induction motor 38 (shown in phantom), sprocket 39 and belt 40. Sprocket 39 is connected to a fan mount 42. Rotation of the shaft of induction motor 38 causes rotation of sprocket 39 which, in turn, causes rotation of the fan (not shown). Induction motor 38 is mounted to a support plate 43 which is adjustably attached to support member 44. Belt-tension adjustment device 45 can adjust the position of support plate 43 with respect to support member 44 in order to adjust the tension on belt 40.

Figure 6:
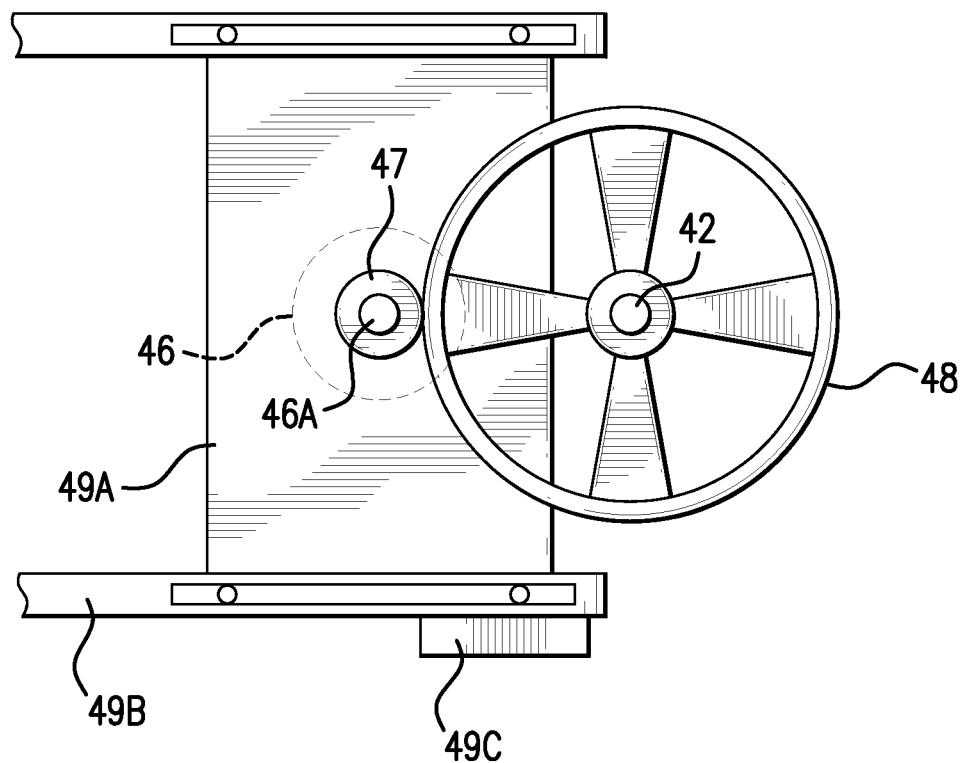
FIG. 6 is a partial, top plan view of a prior art, driven-sprocket fan drive system.

FIG. 6 shows a prior art fan-drive system that uses a drive sprocket to drive the fan in an ACHE system. This fan-drive system comprises induction motor 46 (shown in phantom), driver sprocket 47 and driven sprocket 48. Driver sprocket 47 is connected to the shaft 46A of induction motor 46 and engaged with driven sprocket 48. Driven sprocket 48 is connected to fan mount 42 which is connected to the fan (not shown). Rotation of driver sprocket 47 causes rotation of driven sprocket 48 which, in turn, causes rotation of the fan. Motor 46 is mounted to motor support member 49A. Motor support member 49A is movably attached to support structure 49B. Motor position adjustment device 49C can be used to adjust the position of motor support member 49A so as to ensure proper engagement of driver sprocket 47 and driven sprocket 48.

Figure 7:
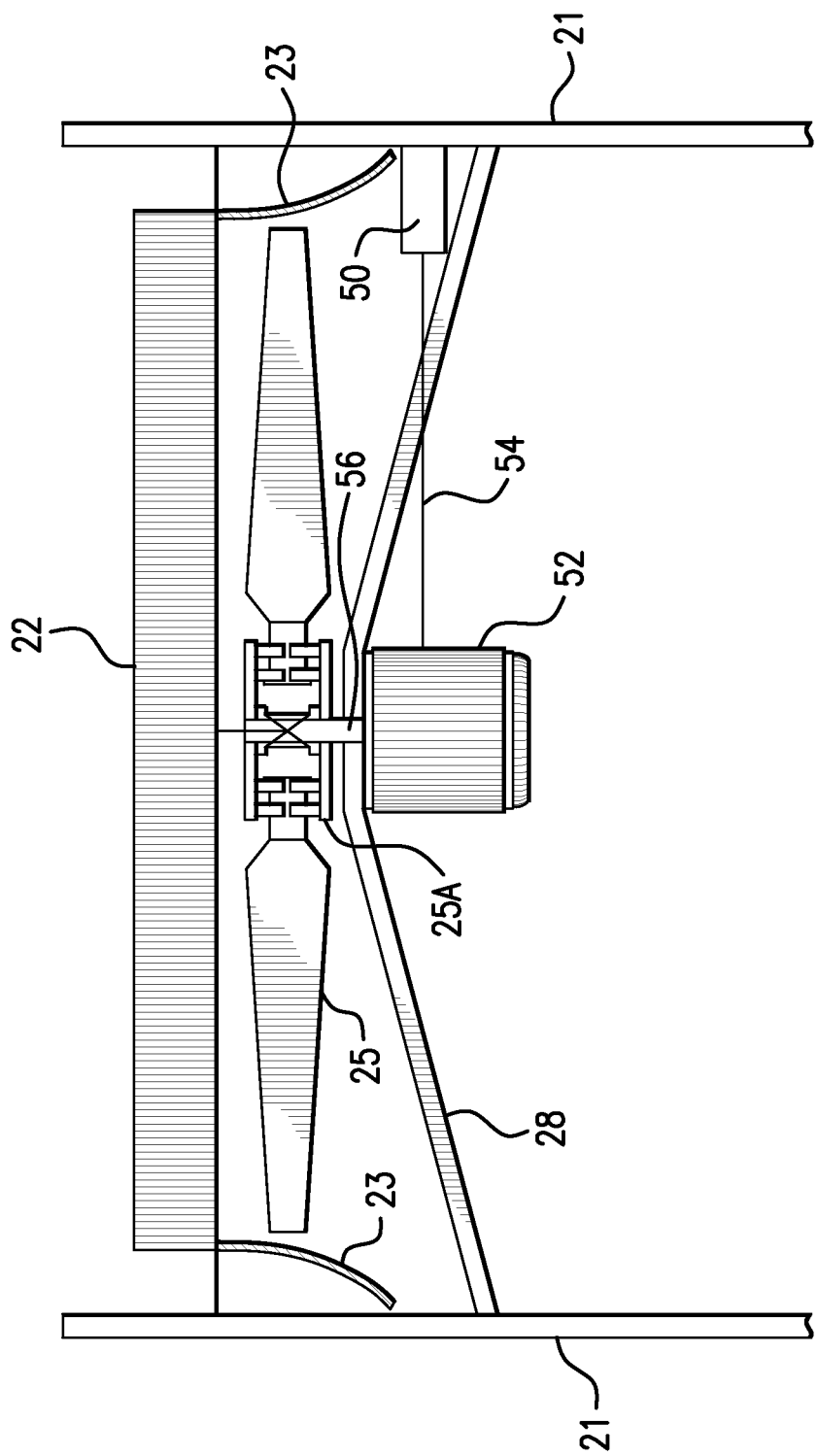
FIG. 7 is a partial, side view, in elevation and partially in cross-section, of a forced-draft, ACHE that uses a fan drive system of the present invention.

Referring to FIG. 7, there is shown a partial view of an ACHE system that is configured as a forced draft ACHE and has the same general structural components as the ACHE shown in FIG. 2, except for the prior art fan drive system which has now been replaced with the fan drive system of the present invention. Since this ACHE system is a forced draft system, fan 25 is below tube bundle 22. The fan drive system of the present invention comprises variable frequency drive (VFD) device 50 and motor 52. In accordance with the invention, motor 52 is a high torque, low speed permanent magnet motor. Permanent magnet motor 52 has a high flux density. The superior results, advantages and benefits resulting from permanent magnet motor 52 are discussed in the ensuing description. VFD device 50 and permanent magnet motor 52 are mounted to or supported by the support structure 28 of the ACHE system. VFD device 50 is in electrical signal communication with permanent magnet motor 52 via cables or wires 54. Permanent magnet motor 52 has shaft 56 that rotates when the appropriate electrical signals are applied to permanent magnet motor 52. Shaft 56 is connected to fan hub 25A. Thus, rotation of vertical shaft 56 causes rotation of fan 25. Fan 25 rotates within fan ring 23.

Figure 8:
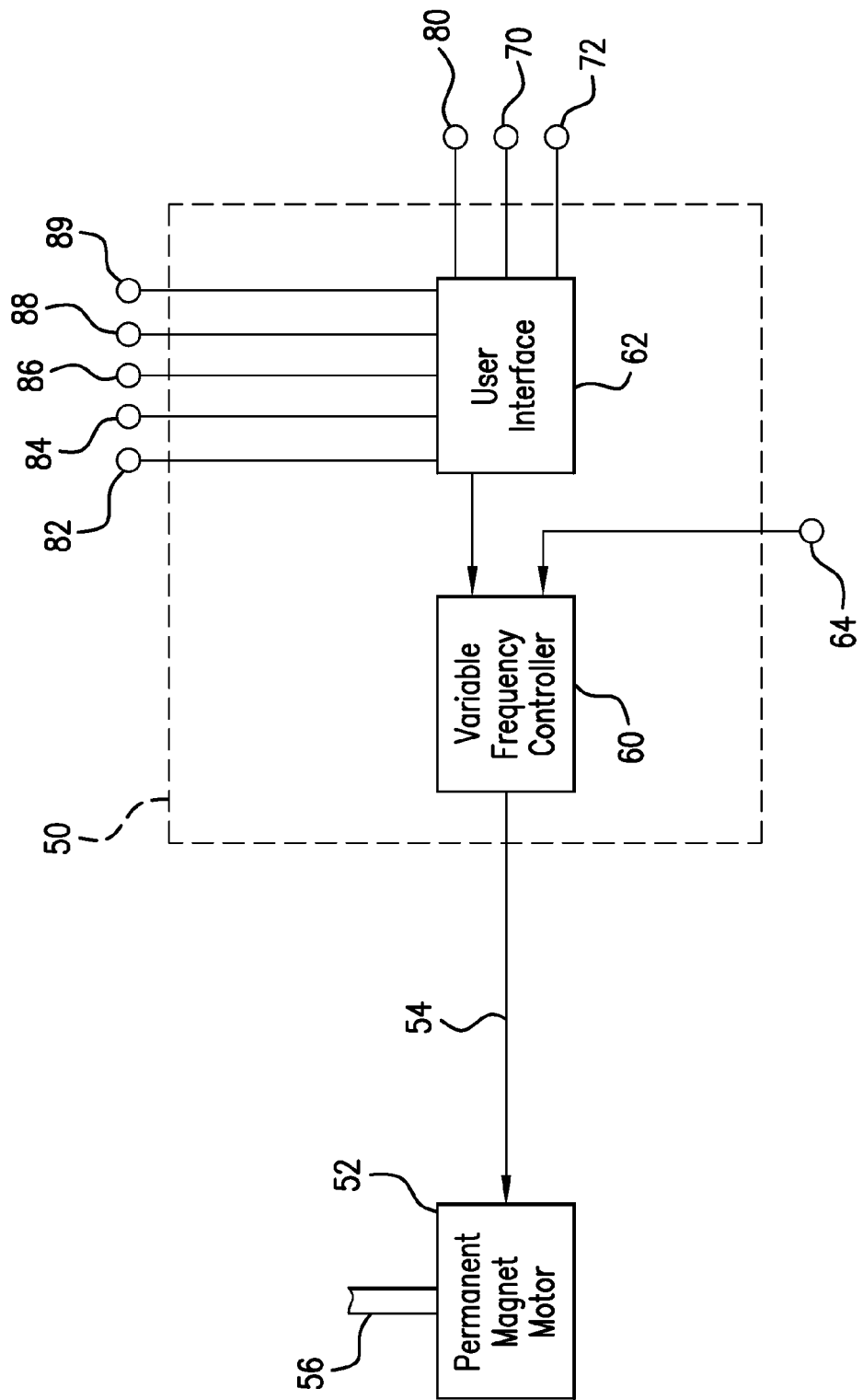
FIG. 8 is a schematic diagram of the fan drive system of the present invention.

Referring to FIG. 8, VFD device 50 comprises a variable frequency controller 60 and a user or operator interface 62. VFD device 50 controls the speed, direction (i.e. clockwise or counterclockwise), and torque of permanent magnet motor 52. AC input power is inputted into variable frequency controller 60 via input 64. Variable frequency controller 60 converts the AC input power to DC intermediate power. Variable frequency controller 60 then converts the DC power into quasi-sinusoidal AC power that is applied to permanent magnet motor 52. User interface 62 provides a means for an operator to start and stop permanent magnet motor 52 and adjust the operating speed of motor 52. In a preferred embodiment, user interface 62 comprises a microprocessor, and an alphanumeric display and/or indication lights and meters to provide information about the operation of motor 52. User interface 62 further includes a keypad and keypad display that allows the user to input desired motor operating speeds. VFD device 50 includes input and output terminals 70 and 72 for connecting pushbuttons, switches and other operator interface devices or controls signals. In a preferred embodiment, VFD device 50 further includes a serial data communication port 80 to allow VFD device 50 to be configured, adjusted, monitored and controlled using a computer. In one embodiment, VFD device 50 includes sensor signal inputs 82, 84, 86, 88 and 89 for receiving sensor output signals. The purpose of these sensors is discussed in the ensuing description.

Referring to FIGS. 7 and 8, permanent magnet motor 52 is directly coupled to the fan hub 25A. Since permanent magnet motor 52 is controlled only by electrical signals provided by VFD device 50, there are no couplings, gear boxes, drive shafts or related components as found in the prior art gearbox-type fan drive system shown in FIGS. 3-4, and there are no sprockets, belts and related components as found in the prior art fan drive system shown in FIG. 5, and there are no driver sprockets, driven sprockets and related components as found in the prior art fan drive system shown in FIG. 6. In accordance with the invention, permanent magnet motor 52 is a high-torque, low speed motor. Permanent magnet motor 52 is of simplified design and uses only two bearings 90 and 92 (see FIG. 9). Permanent magnet motor 52 includes stator 94. Such a simplified design provides relatively high reliability as well as improved energy efficiency. Permanent magnet motor 52 has relatively low maintenance with a three year lube interval. Permanent magnet motor 52 can be configured with sealed bearings. Permanent magnet motor 52 meets or exceeds the efficiency of Premium Efficiency Induction Motors. Permanent magnet motor 52 substantially reduces the man-hours associated with service and maintenance that would normally be required with a prior art, induction motor fan drive system. In some instances, permanent magnet motor 52 can eliminate up to 1000 man-hours of maintenance and service. Such reliability reduces the amount of cell outages and significantly improves product output.

In one embodiment, permanent magnet motor 52 has the following operational and performance characteristics:

Speed Range: 0-350 RPM
Maximum Power: 75 HP
Number of Poles: 12
Motor Service Factor: 1:1
Rated Current: XX A (rms)
Peak Current: 150 A
Rated Voltage: 277 V
Drive Inputs: 277 V, 3 phase, 60 Hz, 90 A (rms max. continuous)

Figure 10:
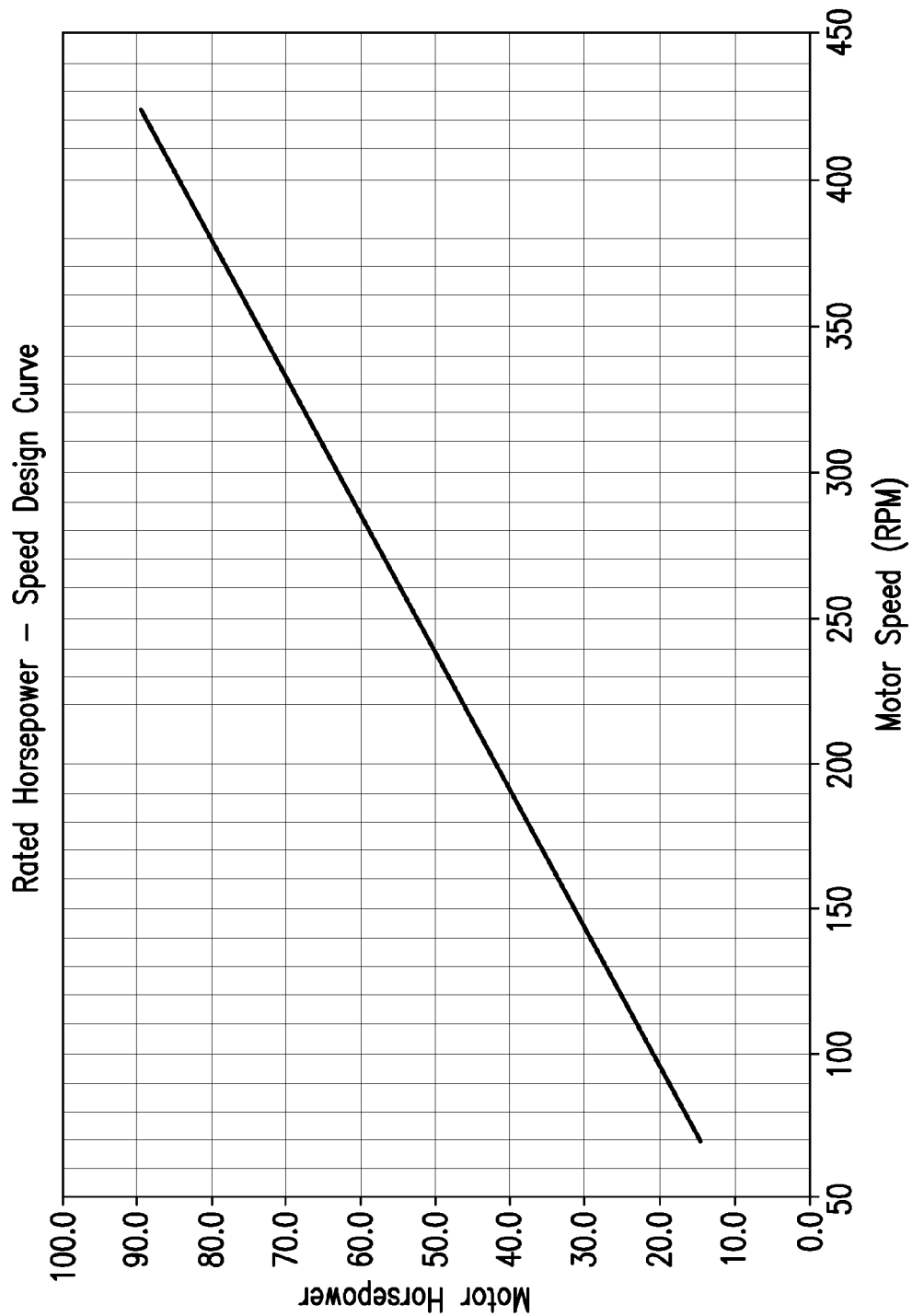
FIG. 10 is a plot of motor speed versus horsepower for a high torque, low speed permanent magnet motor used in the fan drive system of the present invention.

FIG. 10 shows a plot of speed vs. horsepower for high torque, low speed permanent magnet motor 52. However, it is to be understood that the aforesaid operational and performance characteristics just pertain to one embodiment of permanent magnet motor 52 and that motor 52 may be modified to provide other operational and performance characteristics that are suited to a particular application.

Figure 11:
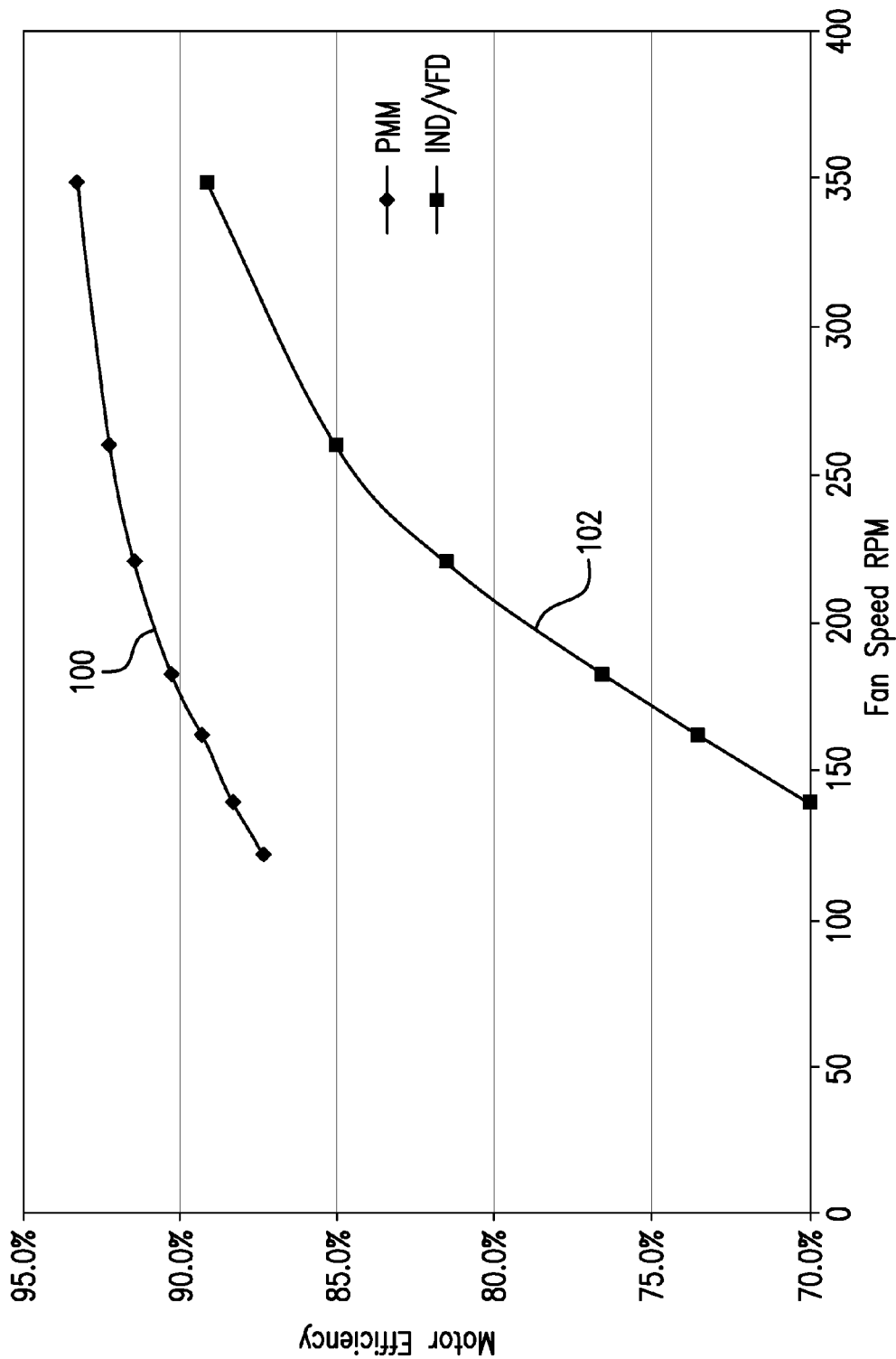
FIG. 11 is a graph illustrating a comparison in performance between the fan drive system of the present invention and a prior art gearbox-type fan drive system that uses a variable speed induction motor.
Figure 12:
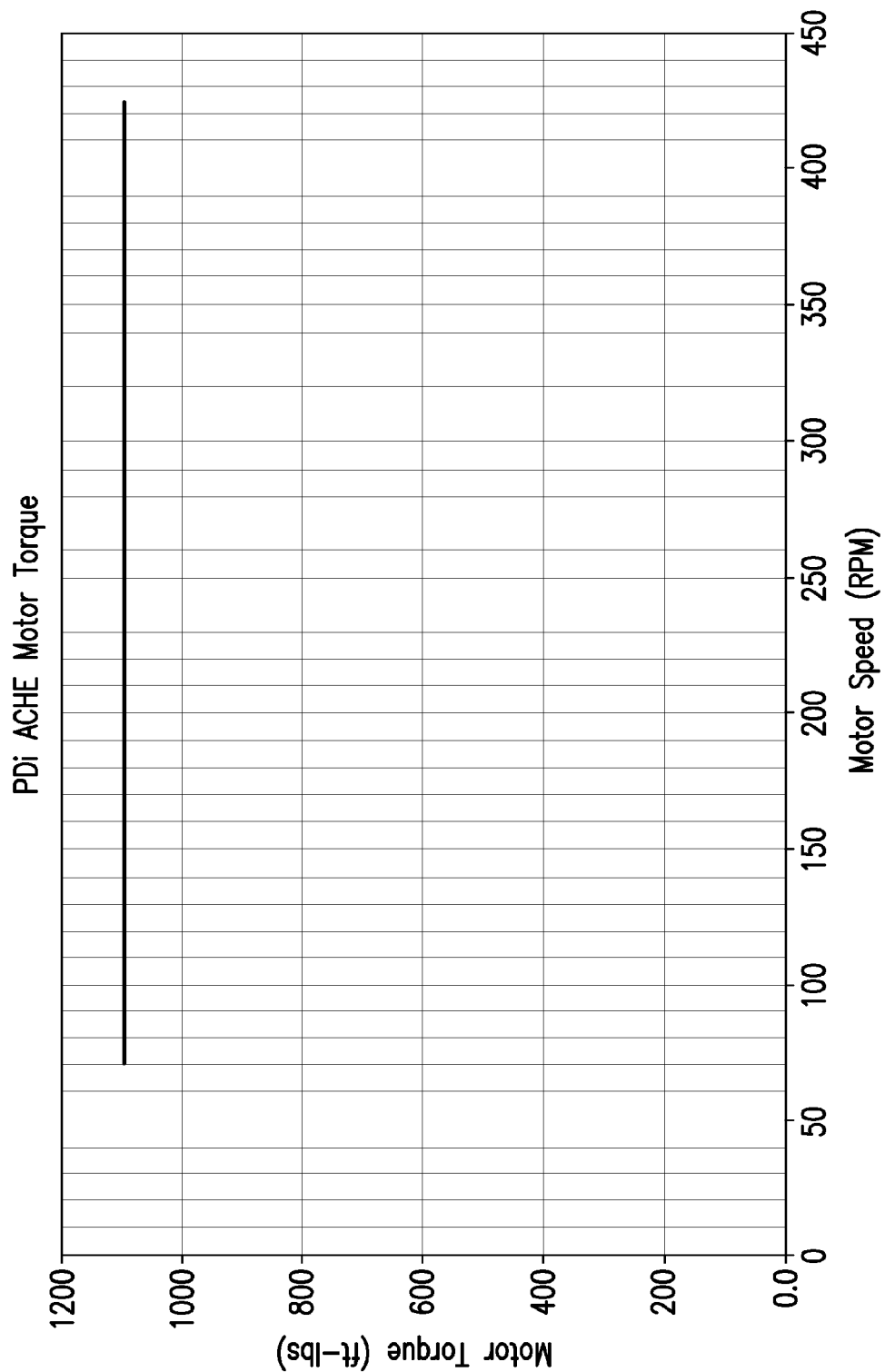
FIG. 12 is a plot of motor speed versus motor torque for the high torque, low speed permanent magnet motor used in the fan drive system of the present invention.

Referring to FIG. 11, there is shown a graph that shows "Efficiency %" versus "Motor Speed (RPM)" for the fan drive system of the present invention and a prior art fan drive system using a variable speed, induction motor. Curve 100 pertains to the present invention and curve 102 pertains to the aforementioned prior art fan drive system. As can be seen in the graph, the efficiency of the present invention is relatively higher than the prior art fan drive system for motor speeds between about 125 RPM and about 350 RPM. Referring to FIG. 12, there is shown a plot of motor torque versus motor speed. Permanent magnet motor 52 exhibits substantially constant torque from about 70 RPM to about 425 RPM.

Figure 9:
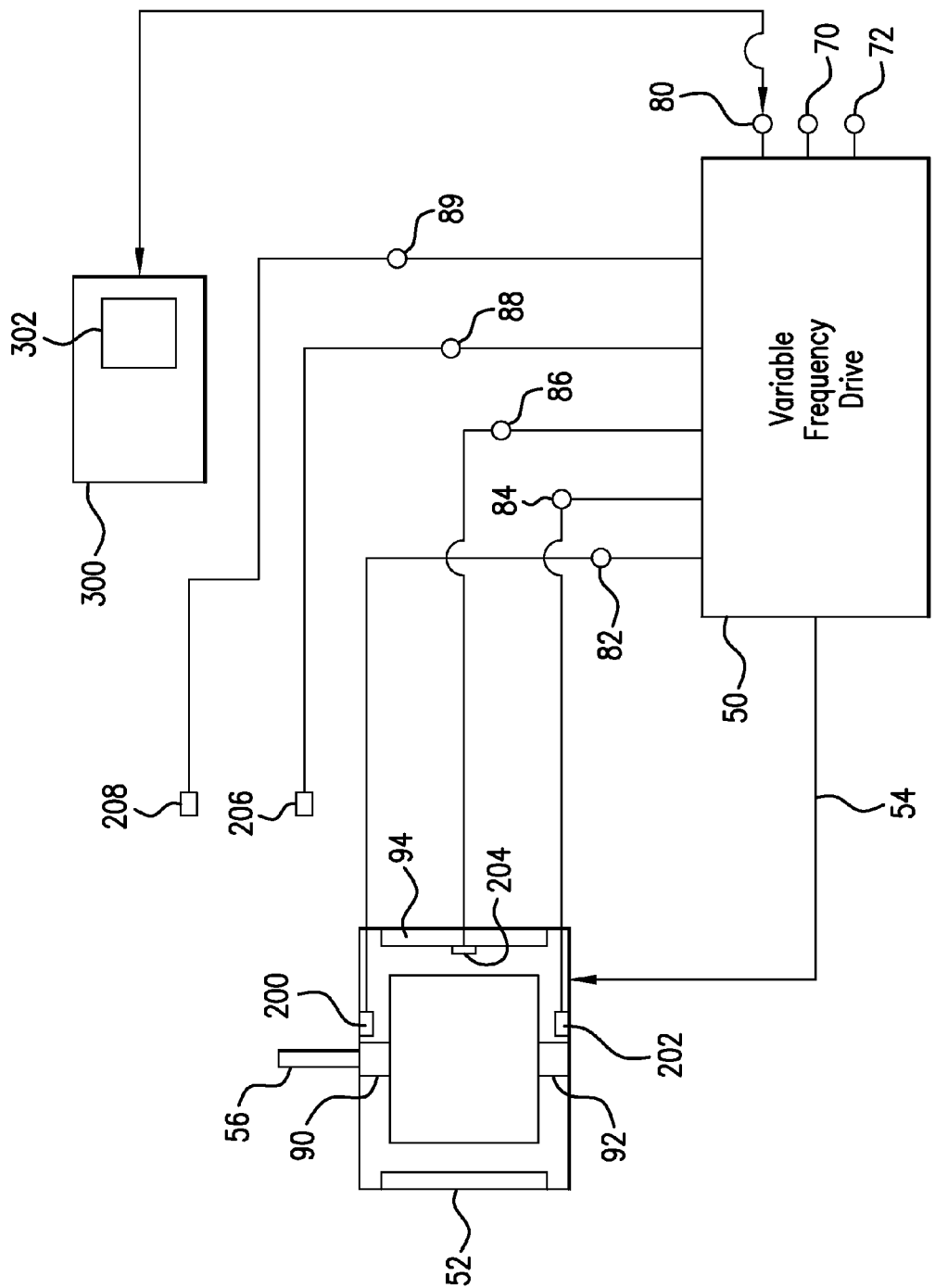
FIG. 9 is a schematic diagram showing the fan drive system of the present invention in conjunction with a plurality of performance monitoring sensors.

Referring to FIG. 9, in a preferred embodiment, the fan drive system of the present invention further comprises a plurality of sensors 200, 202, 204, 206 and 208 that provide sensor signals to sensor signal inputs 82, 84, 86, 88 and 89, respectively, of VFD device 50. Sensors 200 and 202 are positioned in proximity to bearings 90 and 92, respectively, of permanent magnet motor 52 in order to sense vibration and heat. Sensor 204 is positioned on stator 94 of permanent magnet motor 52 to monitor heat at stator 94. Sensors 206 and 208 are positioned downstream of the air flow created by the fan of the ACHE system to measure airflow. For purposes of simplifying FIG. 9, the fan of the ACHE system is not shown. All sensor output signals applied to sensor signal inputs 82, 84, 86, 88 and 89 are inputted into user interface 62 of VFD device 50 and are then routed to an external processing device, such as computer 300, via data port 80. Computer 300 includes a display screen device 302 that enables a user or operator to visually monitor the data outputted by sensors 200, 202, 204, 206 and 208. Computer 300 further includes a user interface, e.g. keyboard, (not shown) that allows an operator to input commands. Computer 300 is configured to implement a reliability algorithm using the data outputted by sensors 200, 202, 204, 206 and 208 and in response, output appropriate control signals that are inputted into user interface 62 via data port 80. Such control signals can be used to adjust the speed of motor 52. Thus, the sensors and computer 300 provide a feedback loop that:

a) monitors vibrations and heat at the bearings of motor 52;
b) monitors heat at the stator of motor 52;
c) monitors airflow produced by the fan of the ACHE system;
d) provides a trim balance to compensate for fan-unbalance inertia on the cooling tower structure;
e) alerts the operators to a "blade-out" situation and automatically reduces the speed of motor 52;
f) locks out a particular motor speed that creates resonance;
g) alerts the operator to imbalance such as ice accumulation on fan blades and automatically initiates corrective action; and
h) sensor data is used by system logic and software algorithms to provide "cooling performance management" of the system. (Cooling performance management provides real-time operating, reliability and performance data and analysis of the cooling system to predict and schedule corrective action, maintenance intervals and provide cooling performance feedback to the operator for use in adjusting the process based on cooling performance).

Figure 13:
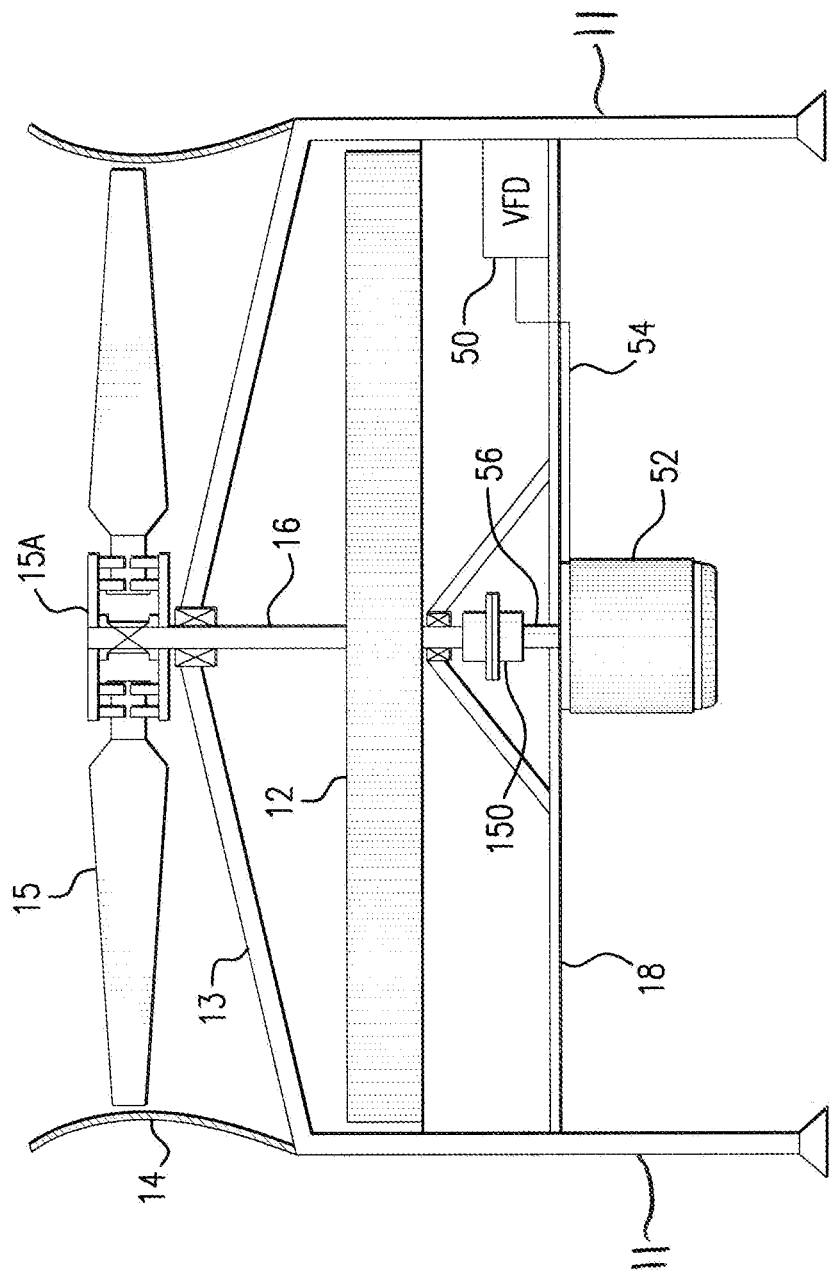
FIG. 13 is a side view, in elevation and partially in cross-section, of an induced draft, ACHE that uses the fan drive system of the present invention.

Referring to FIG. 13, there is shown an ACHE system that is configured as an induced draft ACHE and has the same general structural components as the ACHE shown in FIG. 1, except for the prior art fan drive system which has now been replaced with the fan drive system of the present invention. In this configuration, variable frequency drive (VFD) device 50 and motor 52 are supported by support member 18. Motor 52 is located below tube bundle 12. Fan 15 is positioned above plenum 13 and rotates within fan ring 14 as described in the foregoing description. One end of vertical shaft 16 is coupled to hub 15A and the other end is coupled to shaft 56 with coupling 150. VFD device 50 is in electrical signal communication with permanent magnet motor 52 via cables or wires 54.

Figure 14:
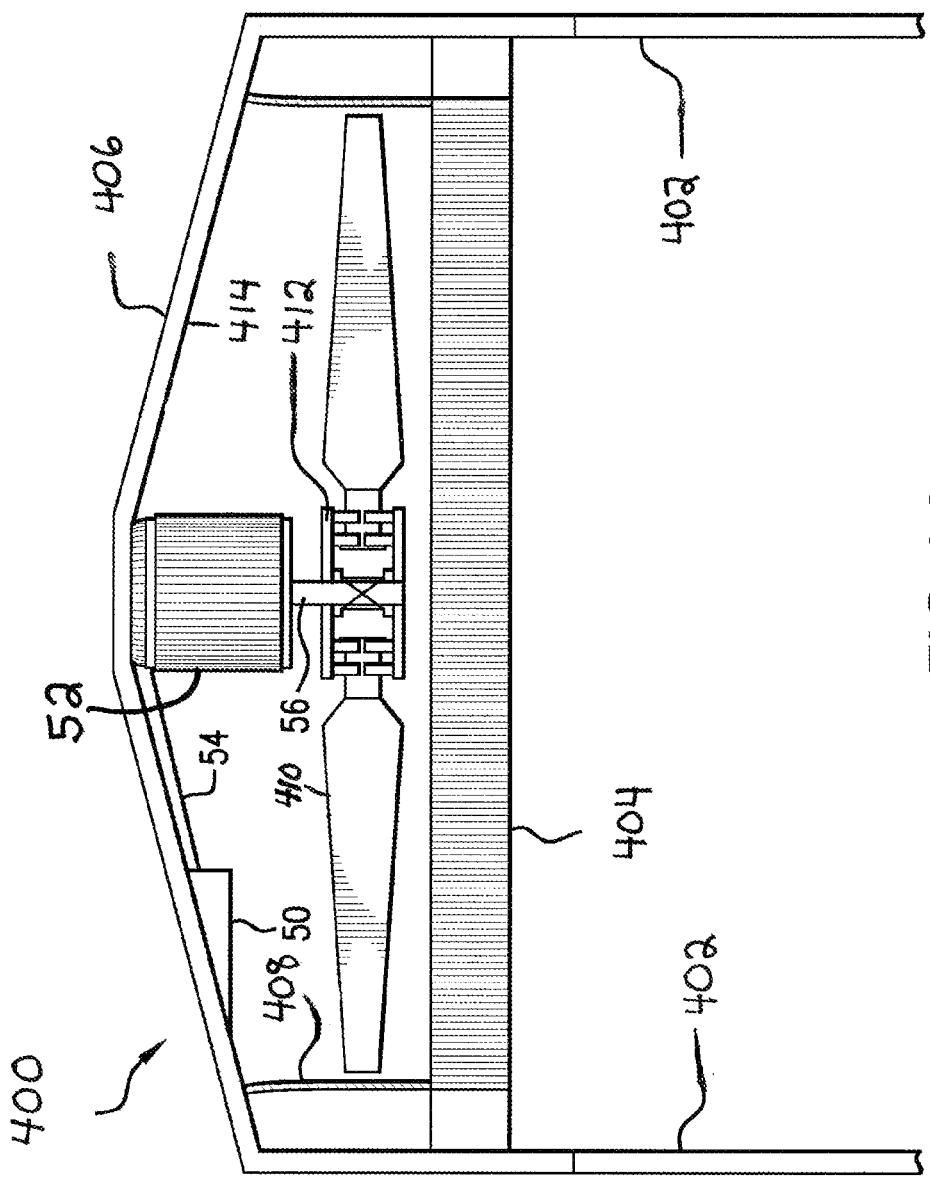
FIG. 14 is a side view, in elevation and partially in cross-section, of an induced draft, ACHE that uses the fan drive system of the present invention, the fan drive system being mounted above the tube bundle.

Referring to FIG. 14, there is shown another ACHE system that is configured as an induced draft ACHE and which uses the fan drive system of the present invention. ACHE system 400 generally comprises a support structure that comprises a plurality of support columns 402. Tube bundle 404 is supported by the ACHE support structure. Plenum 406 is located above tube bundle 404. Fan ring 408 is attached to plenum 406 and to the support structure of ACHE 400. Fan 410 rotates within fan ring 408. Fan 410 includes hub 412. Plenum 406 has an upper portion 414 to which motor 52 and VFD 50 are mounted. Shaft 56 of motor 52 is directly coupled to hub 412 of fan 410. VFD device 50 is in electrical signal communication with permanent magnet motor 52 via cables or wires 54.

Thus, the fan drive system of the present invention provides many advantages and benefits, including:

a) elimination of many components found in the prior art fan drive systems, such as gear boxes, pulleys, belts, sprockets, drive shafts, couplings, bearings, shaft seals, etc.;
b) elimination of oil changes;
c) significant reduction in service and maintenance;
d) ability to vary the speed of the permanent magnet motor over a relative wide range of speeds;
e) ability to reverse direction of the permanent magnet motor without any additional components;
f) consumption of significantly lower amounts of energy in comparison to prior art fan drive systems;
g) easy retrofit with existing fan thereby eliminating need to construct new ACHE cooling towers or structures;
h) significant reduction in the occurrence of cell outages; and
i) provides significantly more cooling capacity in comparison to prior art gearbox-type fan drive.

The operational logic and system architecture of the present invention will provide the ability to optimize the cooling tower for energy efficiency (e.g. at night when it is cold) and to maximize cooling on hot days or when the process demands additional cooling or to avoid fouling of auxiliary systems such as condenser and heat exchangers.

Other significant advantages of the fan drive system of the present invention are improved reliability, in comparison to prior art fan drive systems, "more air flow per ampere" improves electrical efficiency in comparison to prior art systems, and has a relatively smaller footprint due to the elimination the gear train offset thereby providing more space for airflow per envelope and less structural obstructions and passing flow frequency issues. The present invention provides direct-drive simplicity with a simple, two-bearing, robust design. The fan drive system of the present invention is relatively easier to install, maintain and remove. The simple, low-part count design of the fan drive system of the present invention allows it to be "dropped in" existing ACHE installations and eliminates tension-alignment devices that are required by prior art fan drive systems using shafts, belts and pulleys.

The permanent magnet motor 52 is capable of providing constant high-torque with infinitely variable speed control that allows an existing installation envelope to be optimized for cooling effectiveness and high energy efficiency. The permanent magnet motor 52 provides high, constant torque and electrical efficiency through-out the entire variable speed range. Thus, with the fan drive system of the present invention, it is easier to match the required mass airflow of a particular application with the high, constant torque and variable speed of permanent magnet motor 52. This is in contrast to the time consuming, iterative approach previously taken to match motor torque to a pulley (i.e. of a prior art fan drive system) to achieve the required torque to rotate the fan while maintaining speed. The prior art fan drive systems using the induction motor and the pulley or gearbox do not have the constant high torque capacity through out the variable speed range of the fan drive system of the present invention. Existing ACHE systems retrofitted with the fan drive system of the present invention realize significant space savings as a result of the elimination of the prior art complex mechanical system. The fan drive system of the present invention is IP 65 and/or IP 66 wet environment rated. Furthermore, the fan drive system of the present invention may be integrated with a feedback loop to provide variable cooling load control for cooling performance management.

The complex support structure and related "clap trap" of prior art drive systems can result to "passing frequency" and airflow-interruption problems similar to those exhibited in wet cooling towers. However, the direct drive system of the present invention substantially eliminates such problems.

High constant torque of the permanent magnet motor 52, regardless of speed, allows for greater fan pitch and therefore airflow for a given plenum when compared to the incumbent technology and induction motor. Thus, airflow and energy efficiency can be optimized for given demand and outside condition for a given plenum (retrofit) or new application. Thus, the present invention allows for greater design flexibility.

In accordance with the invention, permanent magnet motor 52 is a sealed motor unlike prior art motor drive systems which are open to the environment and susceptible to contamination from water, chemicals, dust and foreign particles.

Although the foregoing discussion is in terms of the applicability of the present invention to the petroleum industry, it is to be understood that the present invention provides benefits to any industry using ACHE cooling systems. Thus, the present invention has applicability to many industries that consume large amounts of energy and are process intensive, such as the power generation, petro-chemical, pulp and paper, chemical, glass, mining, steel, and aluminum industries. Other examples of systems, industries and applications to which the present invention may apply include air cooler fans, process coolers/condensers, gas coolers, gas compressor inter/after coolers, steam condensers, seal/lube oil coolers, closed-loop cooling water system coolers, HVAC, geothermal plant condensers, inter-coolers and after-coolers, HVAC and Refrigeration Condensers, Air-Cooled Condensers, Air Cooled Radiators for large stationary power applications such as gensets as well as transportation applications such as railroad locomotives, marine power, mining and large earth moving equipment.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown in the accompanying drawing figures shall be interpreted as illustrative only and not in a limiting sense. It is also to be understood that the following claims are intended to cover all of the generic and specific features of the invention herein described and all statements of the scope of the invention which, as a matter of language, might be said to fall therebetween.

What is claimed is:

1. A forced-draft, air-cooled heat exchanger for cooling process fluids used in an industrial process, comprising:
   a main support structure that supports the forced draft, air-cooled heat exchanger at a sufficient elevation above grade;
   a tube bundle supported by the main support structure, the tube bundle configured to receive process fluids used in an industrial process;
   a plenum connected to the main support structure and positioned beneath the tube bundle, the plenum being configured to direct air-flow through the tube bundle;
   a fan assembly supported by the main support structure and positioned beneath the plenum, the fan assembly having a plurality of fan blades, wherein rotation of the fan produces an air-flow that is directed through the tube bundle by the plenum; and
   a fan drive system supported by the main support structure and positioned beneath the fan assembly, the fan drive system comprising a permanent magnet motor comprising a motor casing, a stator and a rotatable shaft, the rotatable shaft being connected to the fan.

2. The forced-draft air-cooled heat exchanger according to claim 1 wherein the fan drive system further comprises a device to generate electrical signals that effect rotation of the motor rotatable shaft at a rotational speed in order to rotate the fan.

3. The forced-draft air-cooled heat exchanger according to claim 2 wherein the device comprises a variable frequency drive device.

4. The forced-draft air-cooled heat exchanger according to claim 3 wherein the variable frequency drive device comprises electronic circuitry for receiving control signals that represent a particular rotational speed and generating electrical signals for the permanent magnet motor, wherein the electrical signals represent the rotational speed represented by the received control signals.

5. The forced-draft air-cooled heat exchanger according to claim 1 wherein the permanent magnet motor is a high-torque, low variable speed permanent magnet motor.

6. The forced-draft air-cooled heat exchanger according to claim 1 further comprising vibration sensors to measure vibrations at the bearings and output signals representing the measured vibrations.

7. The forced-draft air-cooled heat exchanger according to claim 1 further comprising a plurality of heat sensors to measure heat at the stator and at the bearings, the heat sensors outputting signals representing the measured heat.

8. The forced-draft air-cooled heat exchanger according to claim 1 further comprising a fan ring connected to the main support structure and positioned beneath the tube bundle, the fan rotating within the fan ring.

9. An induced-draft, air-cooled heat exchanger for cooling high-temperature process fluids used in an industrial process, comprising:
 a main support structure that supports the induced draft, air-cooled heat exchanger at a sufficient elevation above grade;
 a tube bundle supported by the main support structure, the tube bundle configured to receive process fluids used in an industrial process;
 a plenum connected to the main support structure and positioned above the tube bundle;
 a fan assembly positioned above the plenum, the fan assembly comprising a plurality of fan blades and a fan shaft, wherein the fan shaft extends downward through the plenum and tube bundle, wherein rotation of the fan induces an air-flow through the tube bundle; and
 a fan drive system supported by the main support structure and positioned beneath the tube bundle, the fan drive system comprising a permanent magnet motor comprising a motor casing, a stator and a rotatable shaft, the rotatable shaft being connected to the fan shaft.

10. The induced-draft air-cooled heat exchanger according to claim 9 wherein the fan drive system further comprises a device to generate electrical signals that effect rotation of the rotatable shaft of the motor in order to rotate the fan.

11. The induced-draft air-cooled heat exchanger according to claim 10 wherein the device comprises a variable frequency drive device.

12. The induced-draft air-cooled heat exchanger according to claim 11 wherein the variable frequency drive device comprises electronic circuitry for receiving control signals that represent a particular rotational speed and generating electrical signals for the permanent magnet motor, wherein the electrical signals represent the rotational speed represented by the received control signals.

13. The induced-draft air-cooled heat exchanger according to claim 9 wherein the permanent magnet motor is a high-torque, low variable speed permanent magnet motor.

14. The induced-draft air-cooled heat exchanger according to claim 9 further comprising vibration sensors to measure vibrations of the fan assembly and output signals representing the measured vibrations.

15. The induced-draft air-cooled heat exchanger according to claim 9 further comprising a plurality of heat sensors to measure heat at the stator and at the bearings, the heat sensors outputting signals representing the measured heat.

16. The induced-draft air-cooled heat exchanger according to claim 9 further comprising a fan ring connected to the main support structure and positioned above the plenum, the fan rotating within the fan ring.

17. An induced-draft, air-cooled heat exchanger for cooling high-temperature process fluids used in an industrial process, comprising:
 a main support structure that supports the induced draft, air-cooled heat exchanger at a sufficient elevation above grade;
 a tube bundle supported by the main support structure, the tube bundle configured to receive process fluids used in an industrial process;
 a plenum connected to the main support structure and positioned above the tube bundle;
 a fan drive system supported by plenum and positioned above the tube bundle, the fan drive system comprising a permanent magnet motor comprising a motor casing, a stator and a rotatable shaft; and
 a fan assembly positioned above the tube bundle, the fan assembly comprising a plurality of fan blades, wherein the rotatable shaft of the motor is connected to the fan and wherein rotation of the fan induces an air-flow through the tube bundle.

18. The induced draft, air-cooled heat exchanger according to claim 17 wherein the permanent magnet motor is a high-torque, low variable speed permanent magnet motor and wherein the drive system further comprises a device to generate electrical signals that effect rotation of the rotatable shaft of the motor in order to rotate the fan.

19. The induced-draft air-cooled heat exchanger according to claim 18 wherein the device comprises a variable frequency drive device.

20. The induced draft, air-cooled heat exchanger according to claim 17 further comprising a fan ring connected to the plenum, wherein the fan rotates within the fan ring.

21. An induced air-cooled heat exchanger for use in a petroleum refinery for cooling fluids used in a petroleum refining process wherein the air-cooled heat exchanger has a tube bundle for receiving the fluids, and a fan that causes an airflow that cools the fluid flowing through the tube bundle, wherein the improvement comprises:
 a high-torque, low variable speed permanent magnet motor comprising a rotatable shaft directly connected to the fan; and
 a variable frequency drive device to generate electrical signals that effect rotation of the rotatable shaft in order to rotate the fan.

* * * * *